United States Patent
Welch

(10) Patent No.: US 7,146,288 B1
(45) Date of Patent: Dec. 5, 2006

(54) SYSTEM AND METHOD FOR ESTIMATING QUANTIZATION ERROR IN SAMPLED DATA

(75) Inventor: Henry L. Welch, Grafton, WI (US)

(73) Assignee: Johnson Controls Technology Company, Holland, MI (US)

( * ) Notice: Subject to any disclaimer, the term of this patent is extended or adjusted under 35 U.S.C. 154(b) by 848 days.

(21) Appl. No.: 10/197,004

(22) Filed: Jul. 18, 2002

(51) Int. Cl.
G06F 19/00 (2006.01)
H04N 7/26 (2006.01)

(52) U.S. Cl. ............ 702/179; 341/126; 341/155; 341/200

(58) Field of Classification Search ............ None
See application file for complete search history.

(56) References Cited

U.S. PATENT DOCUMENTS

| | | | | |
|---|---|---|---|---|
| 5,552,999 | A * | 9/1996 | Polgreen et al. | 702/63 |
| 5,559,899 | A * | 9/1996 | Schmidt | 382/224 |
| 6,177,894 | B1 * | 1/2001 | Yamaguchi | 341/120 |
| 6,326,909 | B1 * | 12/2001 | Yamaguchi | 341/120 |
| 6,476,742 | B1 * | 11/2002 | Yamaguchi | 341/120 |
| 6,675,125 | B1 * | 1/2004 | Bizjak | 702/179 |
| 6,862,540 | B1 * | 3/2005 | Welch et al. | 702/44 |
| 2002/0005794 | A1 * | 1/2002 | Yamaguchi | 341/120 |
| 2005/0089222 | A1 * | 4/2005 | Lee et al. | 382/168 |

OTHER PUBLICATIONS

Keithley Data Acquisition Catalog and Reference Guide, 1998, p. B-326.*

* cited by examiner

Primary Examiner—Patrick J. Assouad
(74) Attorney, Agent, or Firm—Foley & Lardner LLP

(57) ABSTRACT

A method and apparatus for determining quantization error in data is disclosed. The method comprises gathering a plurality of data points, identifying a range of the data points, separating the data points into a plurality of segments, and estimating the quantization error by calculating the ratio between the data range and the quantity of segments. The apparatus comprises means for gathering a plurality of data points, means for identifying a range of the data points, means for separating the data points into a plurality of segments, and means estimating the quantization error by calculating the ratio between the range and the quantity of the segments.

25 Claims, 6 Drawing Sheets

SYSTEM AND METHOD FOR ESTIMATING QUANTIZATION ERROR IN SAMPLED DATA

FIELD OF THE INVENTION

The present invention relates to a system and method for estimating quantization noise in sampled data.

BACKGROUND OF THE INVENTION

Large buildings often incorporate computerized control systems that manage the operation of different subsystems, such as heating, ventilation and air conditioning ("HVAC"). In addition to ensuring that the subsystem performs as desired, the control system typically operates the associated equipment as efficiently as possible.

A large entity may have numerous buildings under common management, such as on a university campus or a chain of stores located in different cities. To accomplish this, the controllers in each building gather data regarding performance of the building subsystems so that the data can be analyzed at the central monitoring location.

With the cost of energy increasing, building owners are looking for ways to manage and conserve utility consumption. In addition, the cost of electricity for large consumers may be based on the peak use during a billing period. Thus, high consumption of electricity during a single day can affect the rate at which the service is billed during an entire month. Moreover, certain preferential rate plans require a customer to reduce consumption upon the request of the utility company, such as on days of large service demand throughout the entire utility distribution system. Failure to comply with the request usually results in stiff monetary penalties which raises the energy cost significantly above that for an unrestricted rate plan. Therefore, energy usage should be precisely measured to determine the best rate plan and implement processes to ensure that operation of the facility does not inappropriately cause an increase in utility costs.

The ability to analyze energy or utility consumption is also of importance in identifying abnormal consumption. Abnormal energy or utility consumption may indicate malfunctioning equipment or other problems in the building. Therefore, precisely monitoring utility usage and detecting abnormal consumption levels can indicate when maintenance or replacement of the machinery is required.

As a consequence, sensors are being incorporated into building management systems to measure utility usage for the entire building, as well as specific subsystems such as heating, ventilation and air conditioning equipment. These management systems collect and store massive quantities of utility use data that can be overwhelming to the facility operator when attempting to analyze that data in an effort to detect anomalies.

Sampled data is only as good as the sensor that measures and records the data. There are many sources of noise in sampled data and one of the easiest to control is that caused by quantization. Simply put, a sampling sensor rounds its reading to the nearest level of its resolution. Quantization error or level is a measure of the amount of round off that occurs. Such quantization error typically occurs in analog sampling and relates to measurement of sensor resolution/precision. By properly configuration of the sensor, the quantization error can be reduced to a reasonable level.

It is generally known how to manually analyze quantization error. However, such conventional methods of estimating quantization error have several disadvantages including tedious inspection of large amounts of energy usage data.

Accordingly, it would be advantageous to provide a system and method for estimating the precision of sampled data. It would also be advantageous to provide a system and method for estimating quantization noise in an energy usage sensor. It would be desirable to provide for a system and method for estimating quantization noise in sampled data having one or more of these or other advantageous features.

This invention describes an algorithm that can examine a series of sampled data points and from them provide a good estimate of the amount of quantization error that is occurring in both absolute quantities and as a percentage of the values being sampled. The advantages to this are that the level of this error can be determined automatically and can be used to quickly flag sensors that should be corrected. It has a clear application in our facility monitoring applications.

SUMMARY OF THE INVENTION

The present invention relates to a method for determining quantization error in data. The method comprises gathering a plurality of data points, identifying a range of the data points, separating the range into a plurality of segments, and estimating the quantization error by calculating the ratio between the data range and the number of segments containing data points.

The present invention also relates to a method for determining precision of data for a utility meter. The method comprises gathering a plurality of data points, identifying a range of the data points, and estimating the quantization error.

The present invention further relates to an apparatus for determining precision of sampled data. The apparatus comprises means for gathering a plurality of data points, means for identifying a range of the data points, means for separating the data points into a plurality of segments, and means estimating the quantization error by calculating the ratio between the range and the quantity of the segments containing data points.

The present invention further relates to various features and combinations of features shown and described in the disclosed embodiments.

DETAILED DESCRIPTION OF PREFERRED AND OTHER EXEMPLARY EMBODIMENTS

The present invention relates to a process by which the data acquired from a given sensor is analyzed to estimate or determine its precision. By understanding the precision of a sensor, the operations staff or management may identify problematic meters and reduce energy costs by reducing over-charges, and better informed decisions intended to reduce utility costs. According to a preferred embodiment, the precision is estimated by estimating the data's quantization noise or error.

Figure 1:
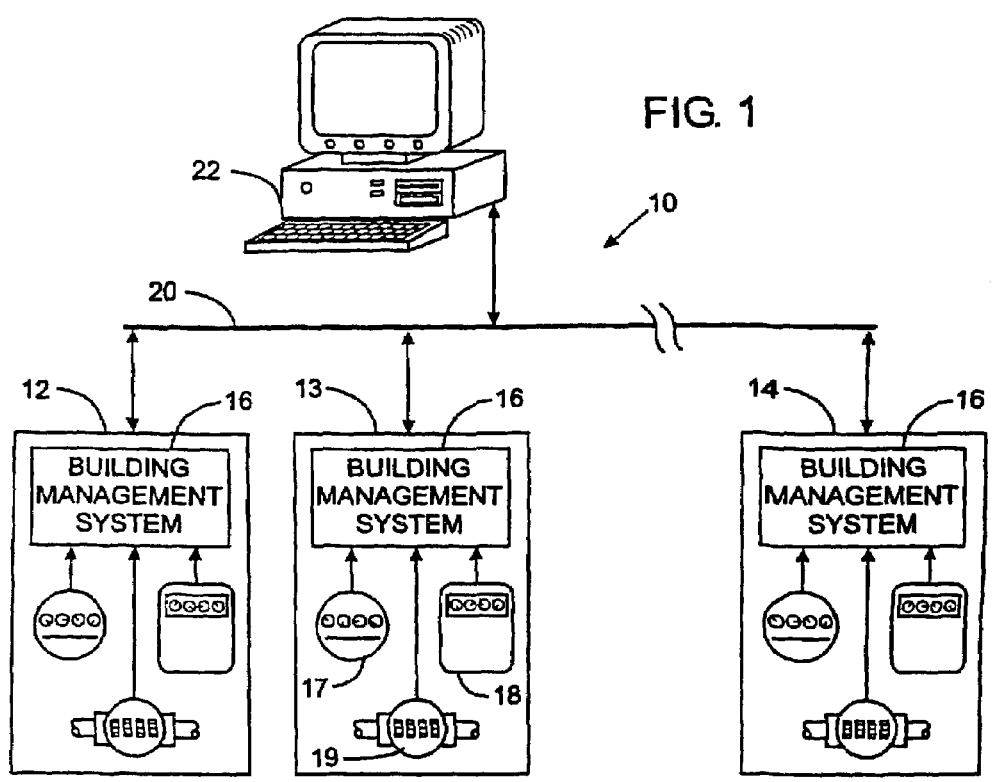
FIG. 1 is a block diagram of a building management system that incorporates the present invention according to an exemplary embodiment.

With reference to FIG. 1, a facility management system 10 supervises the operation of systems in one or more buildings 12, 13 and 14. According to an exemplary embodiment as shown in FIG. 1, each building may contain its own building management system 16, which is a computer that governs the operation of various subsystems within the building. To facilitate this purpose, each building management system 16 is connected to numerous sensors positioned throughout the building to monitor consumption of different utility services at certain points of interest. For example, each management system 16 may be connected to a main electric meter 17, a central gas meter 18, and a main water meter 19. In addition, individual meters for electricity, gas, water and other utilities may be attached at the supply connection to specific pieces of equipment to measure their consumption. For example, water drawn into a cooling tower of an air conditioning system may be monitored, as well as the electric consumption of the pumps for that unit. Periodically, each management system 16 gathers data from the various sensors or meters and stores that information in a database contained within a memory of the computer. These sensors or meters measure and record data according to a particular resolution, which is typically different than the actual values due to "rounding" of recorded values. This rounding of the data affects that recorded data's precision, and is reflected by the quantization noise or error or level. According to an exemplary embodiment, the gathered data can be analyzed either locally by building management system 16 or forwarded via a communication link 20 for analysis by a centralized computer 22 of facility management system 10. Communication link 20 may be, for example, a wide area computer network extending among multiple buildings in an office park or on a university campus. Alternatively, communication link 20 may comprise telephone lines extending between individual stores and the main office of a large retailer spread throughout one or more cities and regions. If the analysis will be performed locally, the system would typically utilize a local area network or direct cable connections for transmitting and receiving the gathered data between the various sensors, databases, computers, and other networked telecommunications equipment in the building management system 16.

Figure 2:
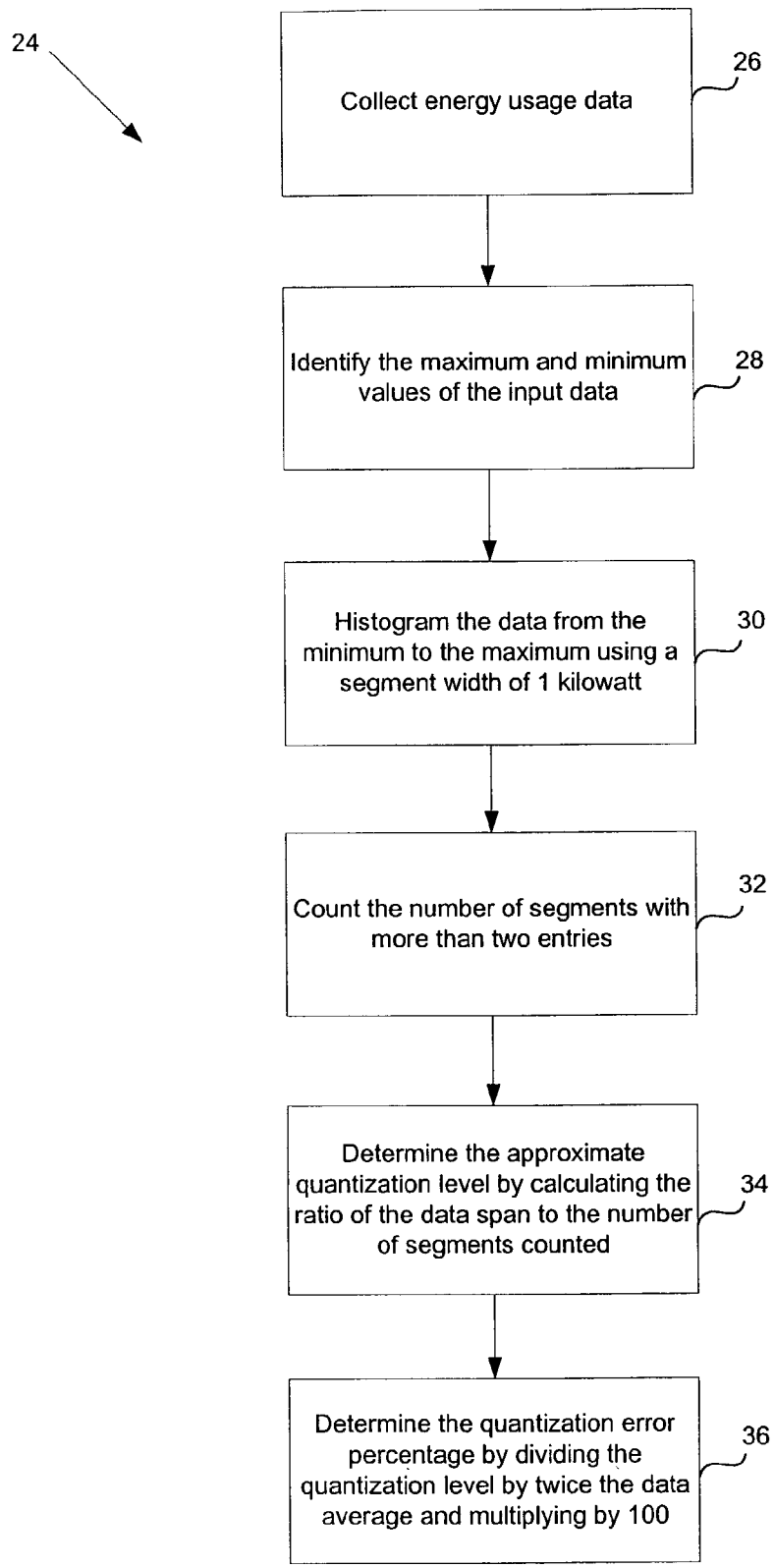
FIG. 2 is a block flow diagram of a method for estimating quantization error in sampled data according to a preferred embodiment.
Figure 3:
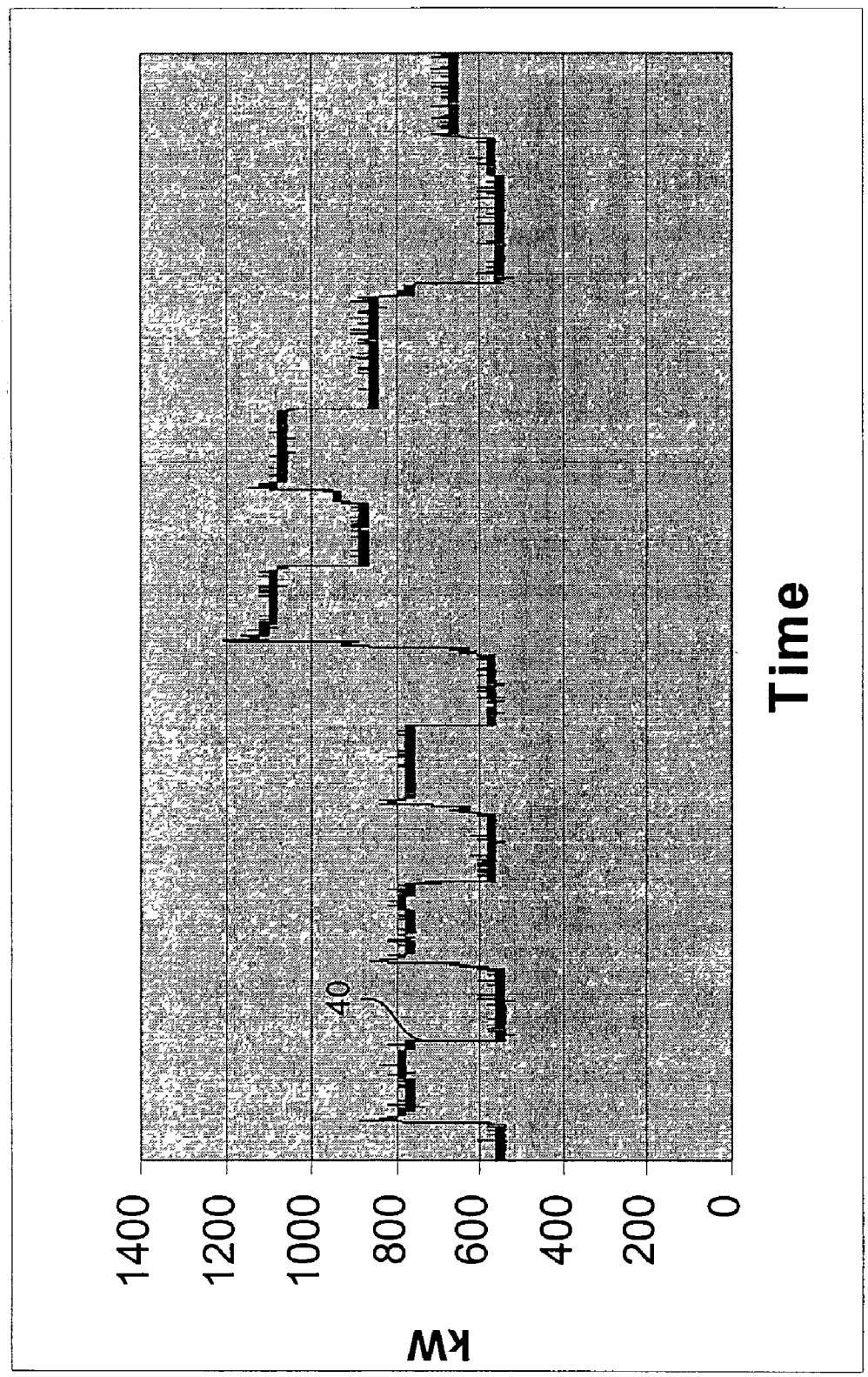
FIGS. 3–6 are time series graphs of energy consumption measured by four different sensors.
Figure 4:
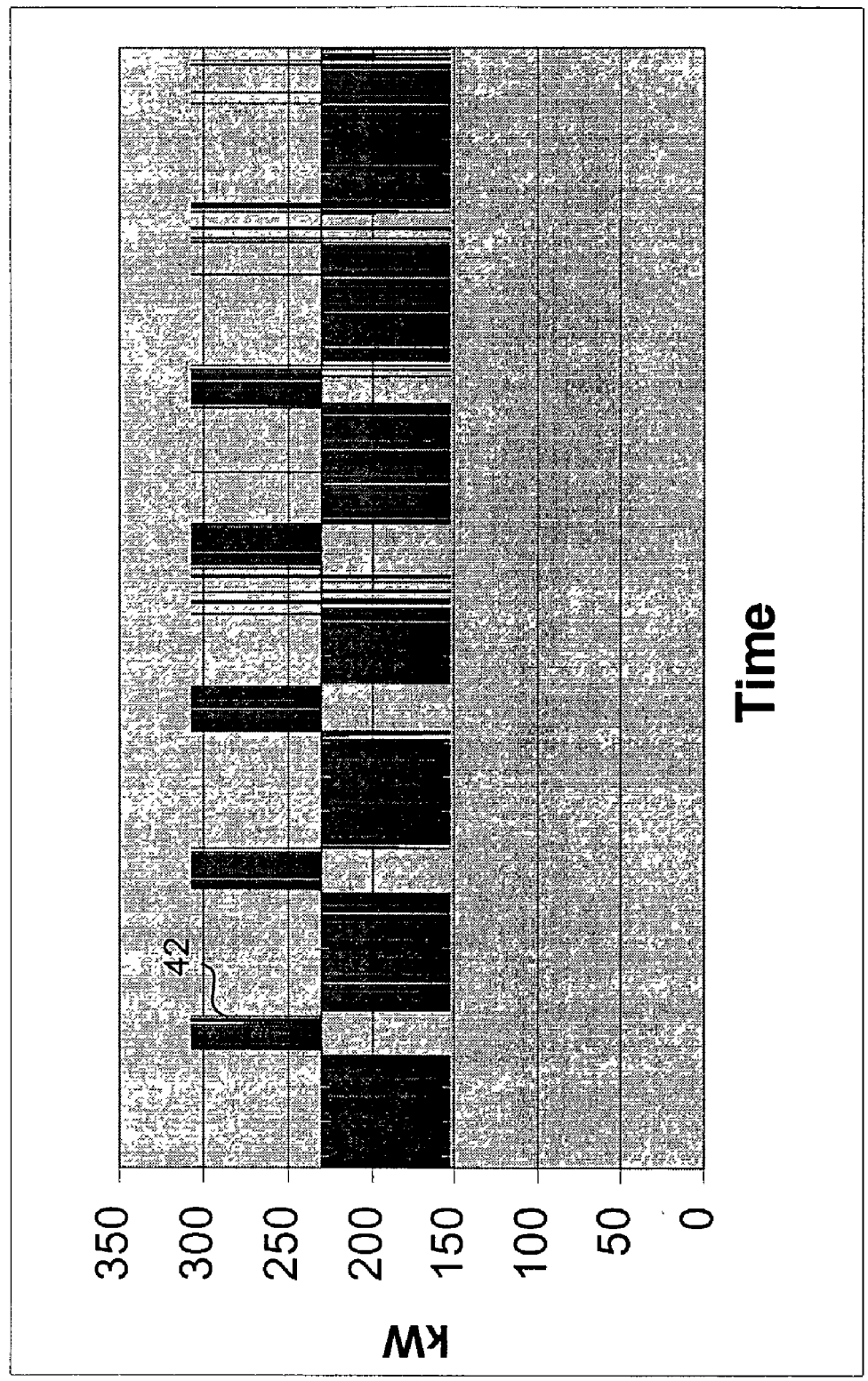
Figure 5:
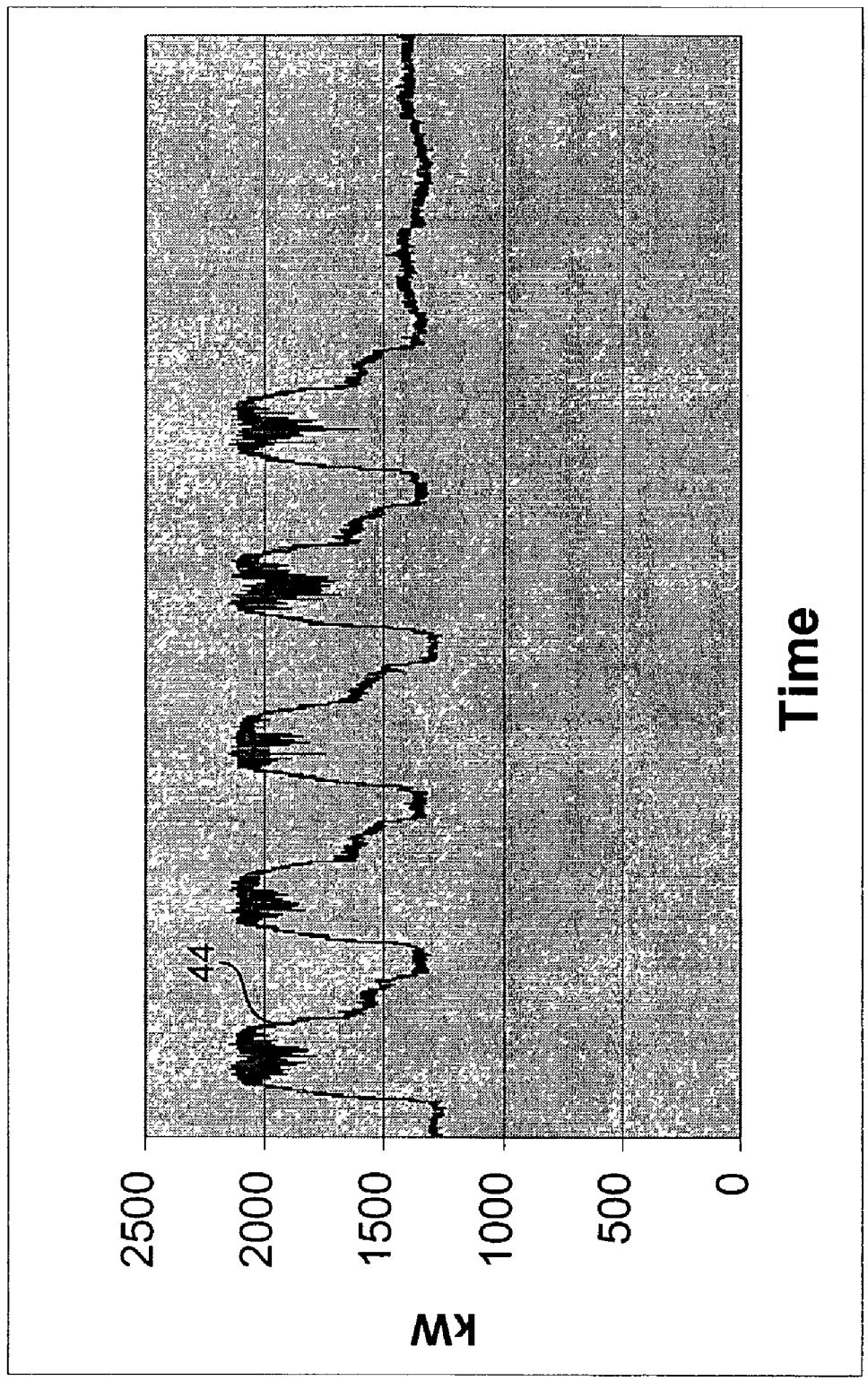
Figure 6:
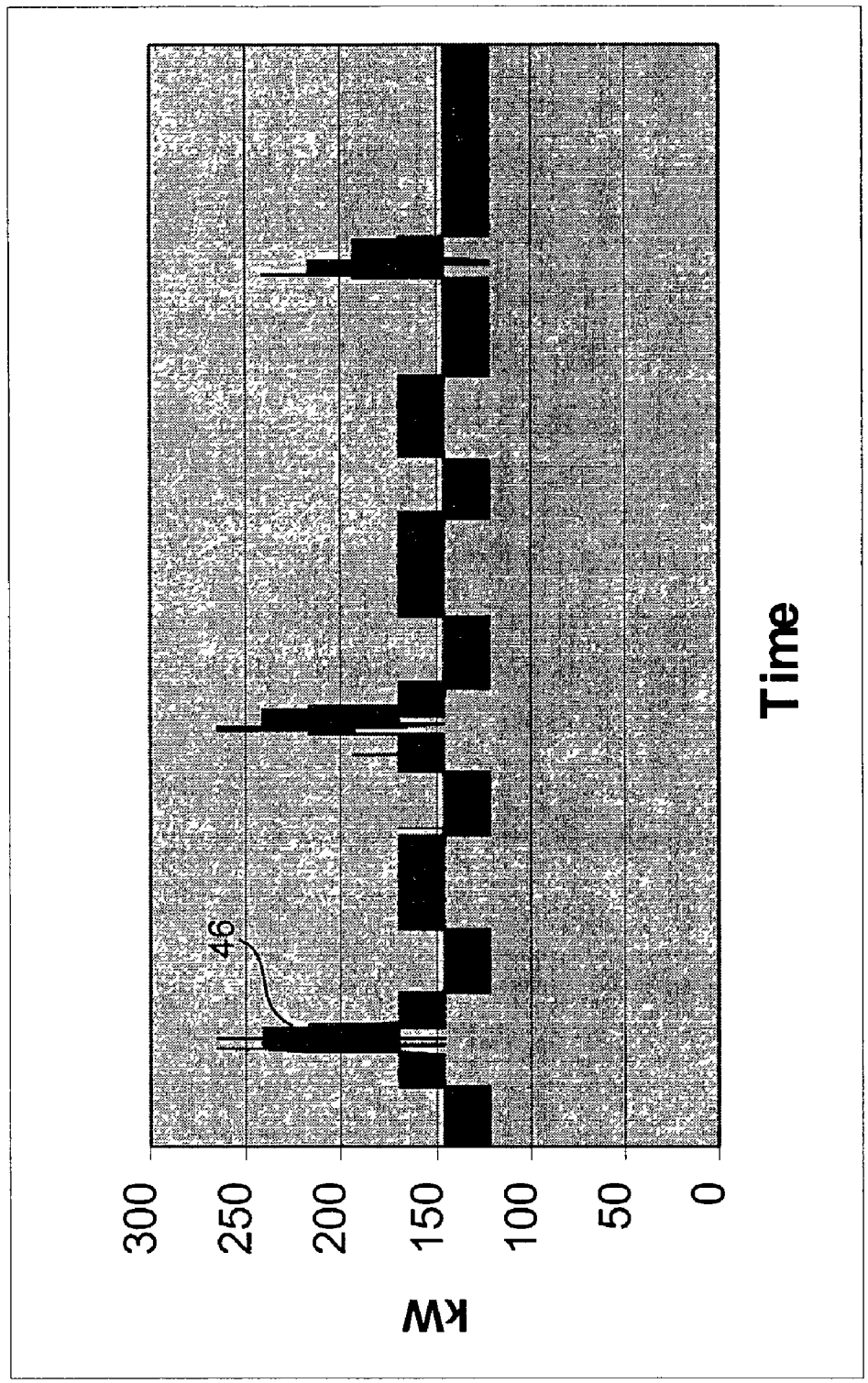

FIG. 2 shows the major components of a quantization noise estimation method 24 in accordance with one embodiment of the present invention. According to an exemplary embodiment, quantization noise estimation method 24 is a program that is resident on management system 16. According to an alternative embodiment, method 24 is a program that is resident on centralized computer 22 of management system 10. According to yet other alternative embodiments, method 24 may be resident on a computer or computer systems at any of a variety of locations, which may or may not be connected to the management system 10 (e.g., local, remote, connected by a network, LAN, WAN, Internet, or the like). In either case, the input to quantization noise estimation method 24 is a time series of energy consumption data such as electricity use, natural gas consumption, district heating consumption, cooling requirements, heating requirements, and the like.

According to an exemplary embodiment, method 24 provides an output (e.g., a return) of the approximate or estimated level of quantization error ("Q") and the approximate or estimated percentage of quantization error relative to the data mean ("QP"). The estimated value of the quantization error (or noise) Q represents the precision of the sensor and provides information indicative of possible overcharges due to imprecise meters.

As illustrated in FIG. 2, quantization noise estimation method 24 begins with collecting data (e.g., energy usage data) over a time interval at a predetermined frequency (step 26). According to a preferred embodiment, the data is comprised of approximately a week's worth of sample interval data for the point or sensor in question. A week's worth of data is considered to be sufficient to provide a good representation of the sensor's performance. According to a particularly preferred embodiment, the data does not include any gaps (i.e., blocks of missing data) or "exceptional usage" values (i.e. an occasional unusually high demand due to an anomalous or exceptional energy usage).

The frequency at which the data is gathered is determined by the operator of the building based on the type of the data and the associated building function. The utility consumption for functions with relatively steady state operation can be sampled less frequently, as compared to equipment having large and/or frequent variations in utility consumption. According to an exemplary embodiment, the frequency that data is gathered is one minute. According to an alternative embodiment, the frequency is a plurality of minutes (e.g., 5, 10, 15, etc.). According to a preferred embodiment, the sampled data comprises 10,080 data points for one week.

Focusing on one type of utility service, such as electricity use for a building, the acquisition of periodic electric power measurements from the main electric meter 17 produces a set of data samples for every minute of the day over an extended period of time, such as a week. Based on these data sets, method 24 is able to estimate the precision of a meter. Although quantization noise estimation method 24 is described in the context of energy usage, it will be recognized that the system and method could be utilized in the context of numerous other utilities such as natural gas and water or for any other sampled analog quantity.

After the data is collected (step 26), the maximum and minimum values of the input data are identified (step 28). These maximum and minimum values provide the range ("R") of the data (i.e., maximum value minus the minimum value).

Then, the data collected at one-minute intervals is histogramed from the minimum to the maximum using a segment width (or bin) of one kilowatt (step 30). A preferred histogram plot comprises kilowatts (kW) on the vertical axis and time on the horizontal axis (see for example FIGS. 3–6). According to alternative embodiments, the segment width can be a fraction of a kilowatt (e.g., ½ kilowatt), more than one kilowatt (e.g., 2, 5, etc.), or the like. According to alternative embodiments, the segment width is determined based on the data being collected, its range, and the desired accuracy of the estimation.

The number of interval segments with more than two entries are then counted or tallied (step 32). As such, segments having two or fewer counts are ignored as being spurious data. According to an alternative embodiment, the number of interval segments with one or fewer counts are ignored. Alternatively, any of a variety of data counts can be selected to filter potentially spurious data, and may depend on the type of data collected; the amount of data collected, the range, the desired accuracy of the estimation, and the like.

A ratio of the data span or range R to the number of segments counted in step 32 are determined to provide the estimated quantization level Q (step 34). The following equation is used to determine the quantization level Q:

$$Q = \frac{R}{C-1} \quad (1)$$

Where R is the range between the maximum and minimum values with more than two counts, and C is the number of segments having more than two counts.

Then the estimated quantization level Q is divided by twice the data average and multiplied by 100 to get the estimated percentage of quantization error QP relative to the data mean (step 36). The following equation is used to determine the percentage error QP:

$$QP = \frac{Q}{2d} * 100 \quad (2)$$

Where d is the average of the data contained within the segments having more than two counts.

According to a particularly preferred embodiment, method 24 is at least partially carried out by the following Matlab Syntax computational resource "quantize(data)" as follows:

```
function [q, qp]=quantize(data)
% quantize examines a block of data to determine the
    level of quantization
% error that occurs through histogramming.
%
% Parameters
% data—the data to examine
%
% Returns
% q—the approximate quantization interval
% qp—quantization as a percentage of data value
% Find the bounds of the histogram
mn=min(data);
mx=max(data);
% Build histogram
[counts bins]=hist(data,mn:mx);
% Count the number of occupied bins
inuse=0;
for i=1:(mx−mn+1)
    if (counts(i)>2) % ignore a spurious bin
        inuse=inuse+1;
    end
end
% Define a quantizing factor as total divided by inuse−1
    (don't count one end)
q=round((mx−mn+1)/(inuse−1));
% Determine quantization relative to data
qp=q/mean(data)*100/2;
```

Now that the details of quantization error method 24 and its associated system have been fully described, the results of actual field tests conducted in different buildings will be described. Although the field test results presented below are taken from only three different meters, it should be noted that data from about a dozen meters in various buildings in North America were used to test and validate the quantization error estimation algorithm described above.

FIGS. 3, 4, 5, and 6 show time series graphs of energy consumption (e.g., solid lines 40, 42, 44, and 46) over a one week period with sensor readings taken every minute. In the field tests, the energy consumption data underlying the graphs shown in FIGS. 3–6 were analyzed by quantization error estimation system and method 24 to estimate the quantization error (i.e., the precision) with a interval segment of 1 KW. Additionally, the energy consumption data was analyzed manually to validate the quantization error estimation algorithm. Table 1 summarizes the final results of this analysis for meters A, B, C, and D.

TABLE 1

|   | Actual Quantization Error (kW) | Estimated Quantization Error (%) | Estimated Quantization Error (kW) |
|---|---|---|---|
| A | 10.8 | 0.33% | 11 |
| B | 21.6 | 1.28% | 24 |
| C | 76.8 | 17.29% | 77 |
| D | 24.1 | 9.34% | 27 |

Quantization error of more than a few precentage points may be cause for further investigation, depending on the effect on the utility bill (e.g., whether the cost for peak demand are being misrepresented).

According to an exemplary embodiment, the quantization error system and method is configured to flag estimated quantization error that is greater than 5%. For the exemplary data shown above, Meter C and Meter D would thus be identified as requiring further investigation. According to alternative embodiments, the quantization error system and method may be configured to flag any of a variety of percentage quantization error values or intervals.

As discussed in the preferred and exemplary embodiments above, the quantization error estimation system is used to analyze energy meters or sensors. According to alternative embodiments, the quantization error estimation algorithm may be used to determine precision for any of a variety of sensors, which preferably use a linear quantizer (i.e., so that the sample intervals are evenly spaced) (e.g., temperature flow rate, or other applications where data is measured and/or collected).

It is also important to note that the construction and arrangement of the elements of the system and method for estimating quantization noise in sampled data as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the system and method may be used with any of a variety of readings where knowledge of the amount of precision is desired. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method for determining a quantization level in utility consumption data provided by a sensor, the method comprising:
   gathering a plurality of data points from the sensor representative of utility consumption;
   identifying a range of the data points;
   separating the data points into a plurality of segments;
   estimating the quantization level by calculating the ratio between the data range and the number of segments containing data points; and
   providing the quantization level to an entity such as a utility customer or facility operator.

2. The method of claim 1 further comprising estimating a quantization error percentage by dividing the quantization level by twice average of the data points and multiplying by 100.

3. The method of claim 1 further comprising disregarding segments having two or fewer data points, whereby the number of segments consists of segments with three or more data points.

4. The method of claim 1 wherein the range is defined by maximum and minimum values of the data points over all the segments.

5. The method of claim 1 wherein the step of providing the quantization level to an entity such as a utility customer or facility operator comprises using the quantization level to manage or conserve utility consumption by monitoring utility usage, identifying abnormal consumption levels, identifying malfunctioning equipment, indicating when maintenance or replacement of machinery is required, properly configuring the sensor, identifying a problematic sensor, or identifying possible utility overcharges.

6. The method of claim 1 wherein each segment has a segment width of 1 KW.

7. The method of claim 1 wherein the quantization error is representative of the precision of the sensor.

8. The method of claim 1 wherein the data points comprise sampled data.

9. The method of claim 8 wherein the data points are collected for a time period.

10. The method of claim 9 wherein the time period is a week.

11. The method of claim 1 wherein the quantization level (Q) is estimated from:

$$Q = \frac{R}{C-1}$$

where R is the range between the maximum and minimum data points and C is the number of segments having more than two data points.

12. The method of claim 11, further comprising estimating the quantization error percentage.

13. The method of claim 12 wherein the quantization error percentage (QP) is determined from:

$$QP = \frac{Q}{2d} * 100$$

where d is the average of the data points.

14. An apparatus for determining precision of sampled data from a utility sensor, the apparatus comprising:
   means for gathering a plurality of data points from the sensor that are representative of utility consumption;
   means for identifying a range of the data points;
   means for separating the data points into a plurality of segments;
   means for estimating a quantization error by calculating the ratio between the range and the quantity of the segments containing data points; and
   means for providing the quantization level to an entity such as a utility customer or facility operator to manage or conserve utility consumption by monitoring utility usage, identifying abnormal consumption levels identifying malfunctioning equipment, indicating when maintenance or replacement of machinery is required, properly configuring the sensor, identifying a problematic sensor, or identifying possible utility overcharges.

15. The apparatus of claim 14 wherein the means for gathering data points comprises the sensor.

16. The apparatus of claim 15 wherein the sensor is a utility meter.

17. The apparatus of claim 14 wherein the means for estimating quantization error comprises a processor configured to analyze data with the following equation:

$$Q = \frac{R}{C-1}$$

where R is the range between the maximum and minimum and C is the number of segments having more than two data points.

18. A method for determining a quantization level in utility consumption data provided by a sensor, the method comprising:
   gathering a plurality of data points from the sensor representative of utility consumption;
   identifying a range of the data points;
   separating the data points into a plurality of segments;
   estimating the quantization level by calculating the ratio between the data range and the number of segments containing data points minus one; and
   providing the quantization level to an entity such as a utility customer or facility operator to manage or conserve utility consumption by monitoring utility usage, identifying abnormal utility consumption levels, identifying malfunctioning equipment, indicating when maintenance or replacement of machinery is required, properly configuring the sensor, identifying a problematic sensor, or identifying possible utility overcharges.

19. The method of claim 18 further comprising estimating a quantization error percentage by dividing the quantization level by twice average of the data points and multiplying by 100.

20. The method of claim 18 further comprising disregarding segments having two or fewer data points, whereby the number of segments consists of segments with three or more data points.

21. The method of claim 18 wherein the range is defined by maximum and minimum values of the data points over all the segments.

22. The method of claim 18 wherein the quantization error is representative of the precision of the sensor.

23. The method of claim 18 wherein the data points comprise sampled data.

24. The method of claim 23 wherein the sensor uses a linear quantizer.

25. The method of claim 18 wherein the utility is electricity, gas, or water.

* * * * *